(12) United States Patent
Soh

(10) Patent No.: US 11,907,019 B2
(45) Date of Patent: Feb. 20, 2024

(54) DISPLAY DEVICE

(71) Applicant: Samsung Display Co., LTD., Yongin-si (KR)

(72) Inventor: Yongkwon Soh, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 45 days.

(21) Appl. No.: 17/522,435

(22) Filed: Nov. 9, 2021

(65) Prior Publication Data
US 2022/0197343 A1 Jun. 23, 2022

(30) Foreign Application Priority Data
Dec. 18, 2020 (KR) .......................... 10-2020-0179006

(51) Int. Cl.
*G06F 1/16* (2006.01)

(52) U.S. Cl.
CPC .......... *G06F 1/1652* (2013.01); *G06F 1/1616* (2013.01)

(58) Field of Classification Search
CPC .... G06F 1/1652; G06F 1/1616; G06F 1/1637; G06F 1/1641; G09F 9/301
See application file for complete search history.

(56) References Cited

U.S. PATENT DOCUMENTS

| | | | | |
|---|---|---|---|---|
| 10,164,208 B2* | 12/2018 | Lee | ......................... | B32B 5/145 |
| 10,694,625 B2* | 6/2020 | Park | ..................... | H04M 1/0268 |
| 10,798,831 B2* | 10/2020 | Shin | ...................... | H05K 3/284 |
| 11,048,295 B1* | 6/2021 | Smeeton | ................. | G09F 9/301 |
| 11,089,699 B2* | 8/2021 | Park | ..................... | H04M 1/0268 |
| 11,395,415 B2* | 7/2022 | Gu | ......................... | G06F 1/1601 |
| 2016/0357052 A1* | 12/2016 | Kim | ....................... | H10K 50/84 |
| 2019/0131553 A1 | 5/2019 | Park et al. | | |
| 2021/0382367 A1* | 12/2021 | Hashimoto | ........... | G02F 1/1677 |
| 2022/0167511 A1* | 5/2022 | Feng | ..................... | H10K 77/111 |
| 2022/0269310 A1* | 8/2022 | Xiong | ................... | G06F 1/1652 |

OTHER PUBLICATIONS

Extended European search report for European Patent Application or Patent No. 21213114.8 dated May 12, 2022.

* cited by examiner

*Primary Examiner* — Rockshana D Chowdhury
(74) *Attorney, Agent, or Firm* — KILE PARK REED & HOUTTEMAN PLLC

(57) ABSTRACT

A display device includes a display part including a first flat portion, a second flat portion spaced apart from the first flat portion in a first direction, and a folding portion disposed between the first flat portion and the second flat portion, and a support part disposed under the display part and including a lattice portion and a shape holding portion. Holes are disposed in the lattice portion, the shape holding portion is adjacent to the lattice portion in a second direction intersecting the first direction, and the lattice portion and the shape holding portion overlap the folding portion.

20 Claims, 11 Drawing Sheets

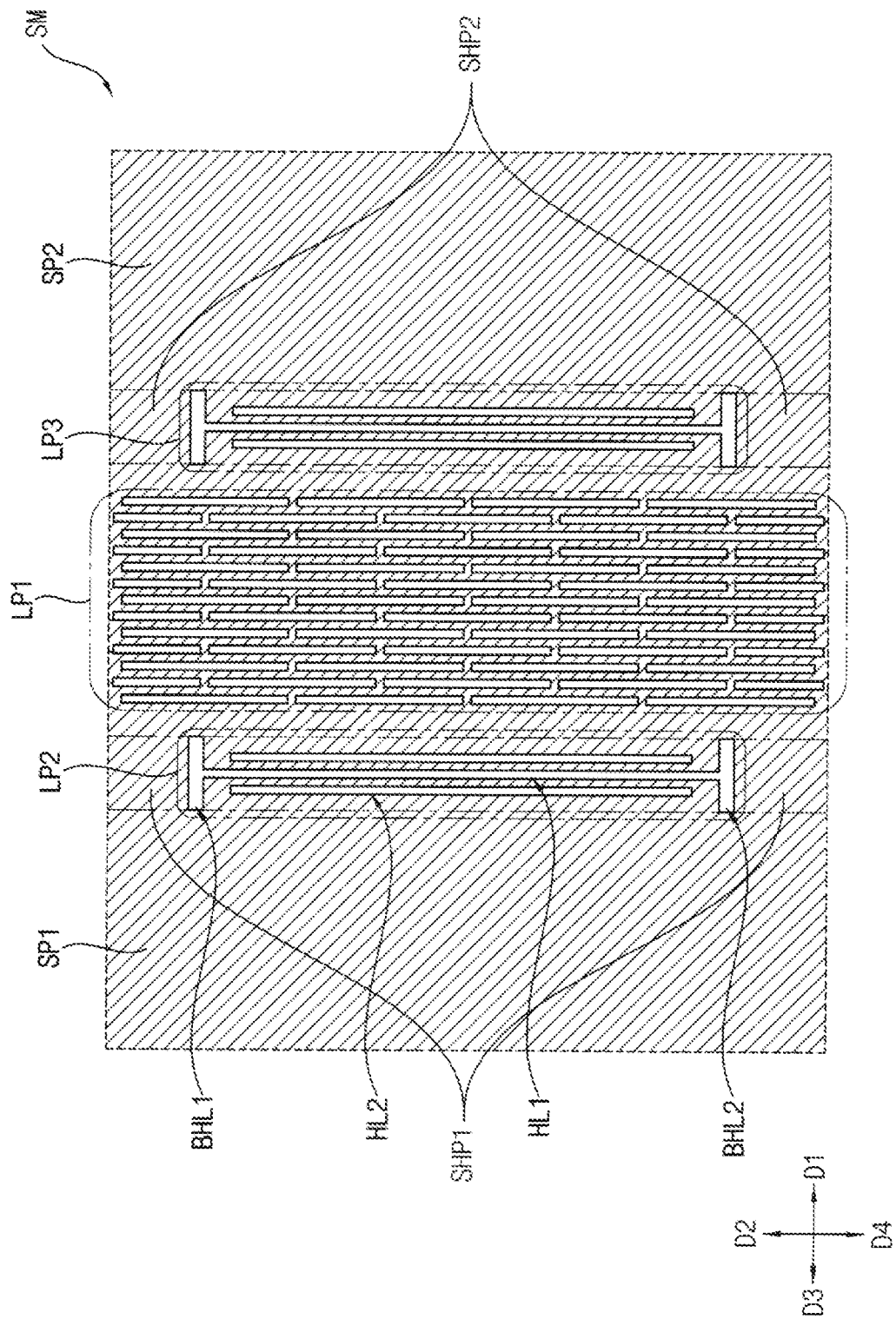

DISPLAY DEVICE

CROSS-REFERENCE TO RELATED APPLICATION(S)

This application claims priority to and benefits of Korean Patent Application No. 10-2020-0179006 under 35 U.S.C. § 119, filed on Dec. 18, 2020 in the Korean Intellectual Property Office, the entire contents of which are incorporated herein by reference.

BACKGROUND

1. Technical Field

Embodiments relate to a flexible display device.

2. Description of the Related Art

A flat panel display device (e.g., an organic light emitting display OLED device) may have advantages in terms of being light in weight and thin in thickness. The development of flexible display devices may take advantage of these characteristics of flat panel display devices. A flexible display device may include a curved display device, a bent display device, a foldable display device, a rollable display device, a stretchable display device, and the like. A flexible display device may include a display module and a support member disposed under the display module. In case that the support member is deformed, the display module supported by the support member may be deformed. Accordingly, wrinkles may occur on an upper surface of the display module, and the flexible characteristic of the display module may be reduced.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments may provide a display device having flexible characteristics.

A display device according to an embodiment may include a display part including a first flat portion, a second flat portion spaced apart from the first flat portion in a first direction, and a folding portion disposed between the first flat portion and the second flat portion, and a support part disposed under the display part and including a lattice portion and a shape holding portion. Holes may be disposed in the lattice portion, the shape holding portion may be adjacent to the lattice portion in a second direction intersecting the first direction, and the lattice portion and the shape holding portion may overlap the folding portion.

In an embodiment, the support part may further include a first support portion overlapping the first flat portion, and a second support portion overlapping the second flat portion, and the shape holding portion, the first support portion, and the second support portion may be integral with each other.

In an embodiment, the shape holding portion may be disposed between the first support portion and the second support portion.

In an embodiment, the shape holding portion may be adjacent to an outermost area of the support part.

In an embodiment, the display device may further include a deco pattern disposed on the display part and overlapping the outermost area of the support part.

In an embodiment, the deco pattern may cover a side surface of the shape holding portion.

In an embodiment, the shape holding portion may include a first portion adjacent to the lattice portion in the second direction, and a second portion adjacent to the lattice portion in a third direction opposing the second direction.

In an embodiment, the display device may further include a boundary hole disposed in the lattice portion, the boundary hole connecting the holes adjacent to the shape holding portion.

In an embodiment, a width of the boundary hole in the first direction may be equal to a width of the lattice portion in the first direction.

In an embodiment, a size of the boundary hole may be larger than a size of each of the holes.

In an embodiment, the holes may penetrate the support part in a thickness direction of the support part.

A display device according to an embodiment may include a display part including a first flat portion, a second flat portion spaced apart from the first flat portion in a first direction, and folding portions disposed between the first flat portion and the second flat portion, and a support part disposed under the display part and including lattice portions and shape holding portions. At least one hole may be disposed in the lattice portions, the shape holding portions may be adjacent to the lattice portions in a second direction intersecting the first direction, and the lattice portions and the shape holding portions may overlap the folding portions.

In an embodiment, the folding portions may include a first folding portion, a second folding portion disposed between the first flat portion and the first folding portion, and a third folding portion disposed between the first folding portion and the second flat portion. The lattice portions may include a first gird portion overlapping the first folding portion, a second lattice portion overlapping the second folding portion, and a third lattice portion overlapping the third folding portion. The shape holding portions may include a first shape holding portion adjacent to the second lattice portion, and a second shape holding portion adjacent to the third lattice portion.

In an embodiment, a curvature of the second folding portion and a curvature of the third folding portion may be smaller than a curvature of the first folding portion.

In an embodiment, the support part may have a structure symmetrical with respect to the first lattice portion.

In an embodiment, the holes and a boundary hole connecting the holes may be disposed in the second lattice portion.

In an embodiment, a first hole and a boundary hole connected to the first hole may be disposed in the second lattice portion.

In an embodiment, a second hole not connected to the boundary hole may be further disposed in the second lattice portion.

In an embodiment, the shape holding portions may be adjacent to an outermost area of the support part.

In an embodiment, the display device may further include a deco pattern disposed on the display part and overlapping the outermost area.

A display device according to the embodiments may include a display part (e.g., module) including at least one folding portion and a support part (e.g., member) disposed under the display module. The support member may include a lattice portion in which holes may be formed and a shape holding portion adjacent to the lattice portion. The lattice portion and the shape holding portion may overlap the folding portion. The shape holding portion may maintain a shape of the support member. For example, the shape holding portion may prevent the lattice portion having relatively weak rigidity by the holes from being deformed. Accordingly, wrinkles due to folding may not occur on the upper surfaces of the display device, and the display device may easily perform folding and unfolding.

BRIEF DESCRIPTION OF THE DRAWINGS

Illustrative, non-limiting embodiments will be more clearly understood from the following detailed description taken in conjunction with the accompanying drawings in which:

FIG. 16 is a schematic plan view illustrating another example of a support part (e.g., member) included in the display device of FIG. 11.

DETAILED DESCRIPTION OF THE EMBODIMENTS

Figure 1:
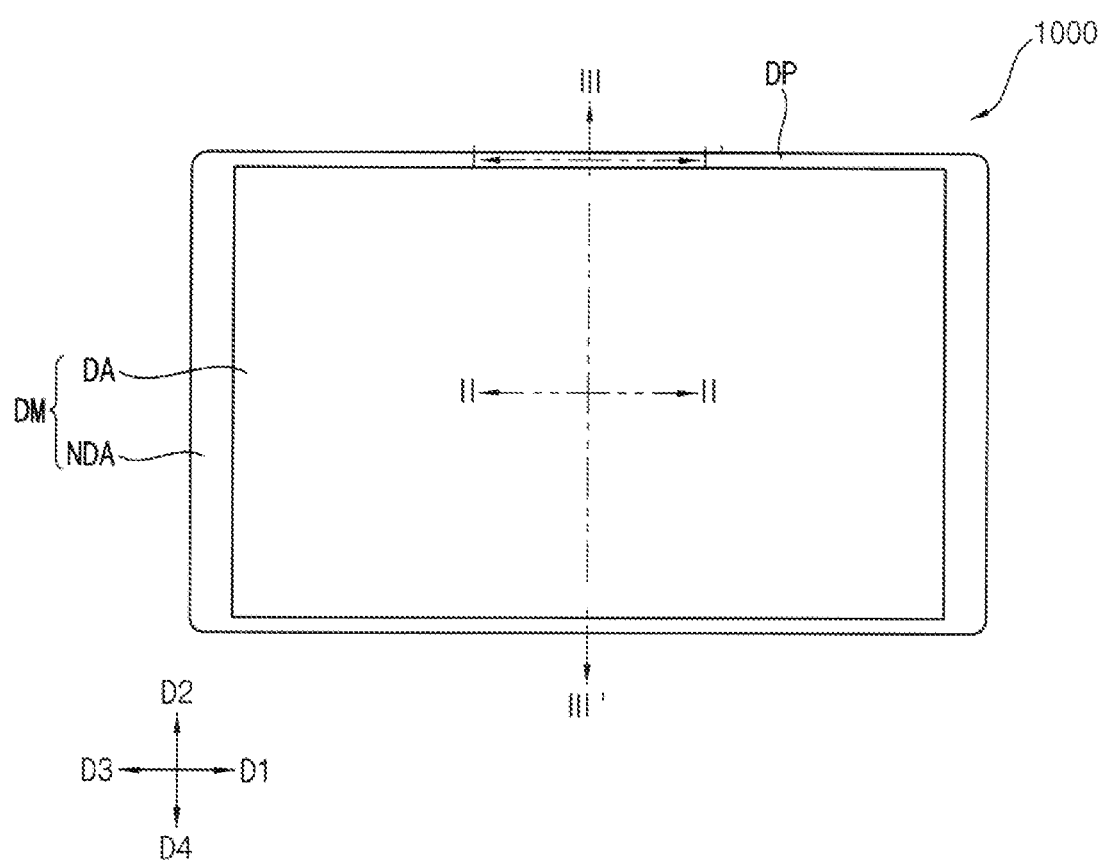
FIG. 1 is a schematic plan view illustrating an unfolded state of a display device according to an embodiment.

Hereinafter, display devices in accordance with embodiments will be explained in detail with reference to the accompanying drawings. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well (and vice versa), unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be understood that the terms "connected to" or "coupled to" may include a physical or electrical connection or coupling.

"About", "approximately", and "substantially" as used herein are inclusive of the stated value and mean within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
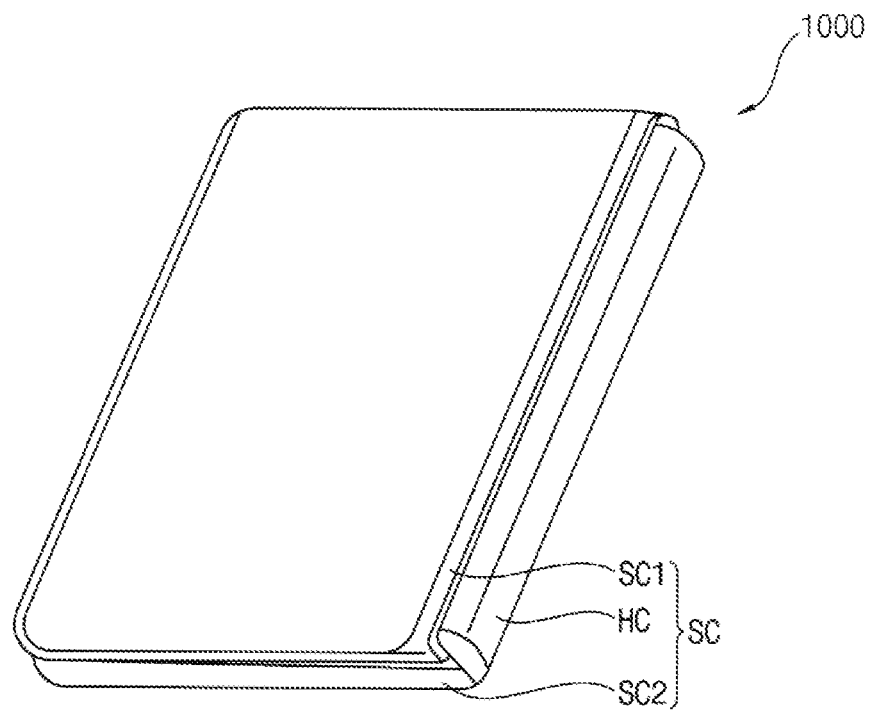
FIG. 2 is a schematic perspective view illustrating a folded state of the display device of FIG. 1.

FIG. 1 is a schematic plan view illustrating an unfolded state of a display device according to an embodiment. FIG. 2 is a schematic perspective view illustrating a folded state of the display device of FIG. 1.

Referring to FIGS. 1 and 2, a display device 1000 according to an embodiment may include a display part (e.g., module) DM, a deco pattern DP, and a set cover SC.

The display module DM may include a display area DA and a non-display area NDA. An image may be displayed in the display area DA, and the non-display area NDA may be disposed to surround the display area DA. The non-display area NDA may constitute a bezel of the display device 1000.

The display module DM may repeatedly perform folding and unfolding. In an embodiment, the display module DM may include a flexible substrate (e.g., a plastic substrate). In case that the display module DM is folded according to an external force applied by a user, a planar size of the display device 1000 may be reduced. In case that the display module DM is unfolded according to an external force applied by a user, the display area DA may be exposed.

The deco pattern DP may be disposed between the display module DM and a window (e.g., a window WIN in FIG. 5), and may overlap the non-display area NDA. In an embodiment, the deco pattern DP may have a color. For example, the deco pattern DP may have black, white, or the like. The deco pattern DP may prevent the display module DM from being deformed, and may prevent the deformed display module DM from being visually recognized by the user.

The set cover SC may include a first set cover SC1, a second set cover SC2, and a hinge cover HC. The first set cover SC1 and the second set cover SC2 may be connected to each other by the hinge cover HC. Based on the hinge cover HC, the display device 1000 may be folded and unfolded. The first set cover SC1 may support a first flat portion (e.g., a first flat portion EP1 in FIG. 5) of the display module DM. The second set cover SC2 may support a second flat portion (e.g., a second flat portion EP2 in FIG. 5) of the display module DM.

Figure 3:
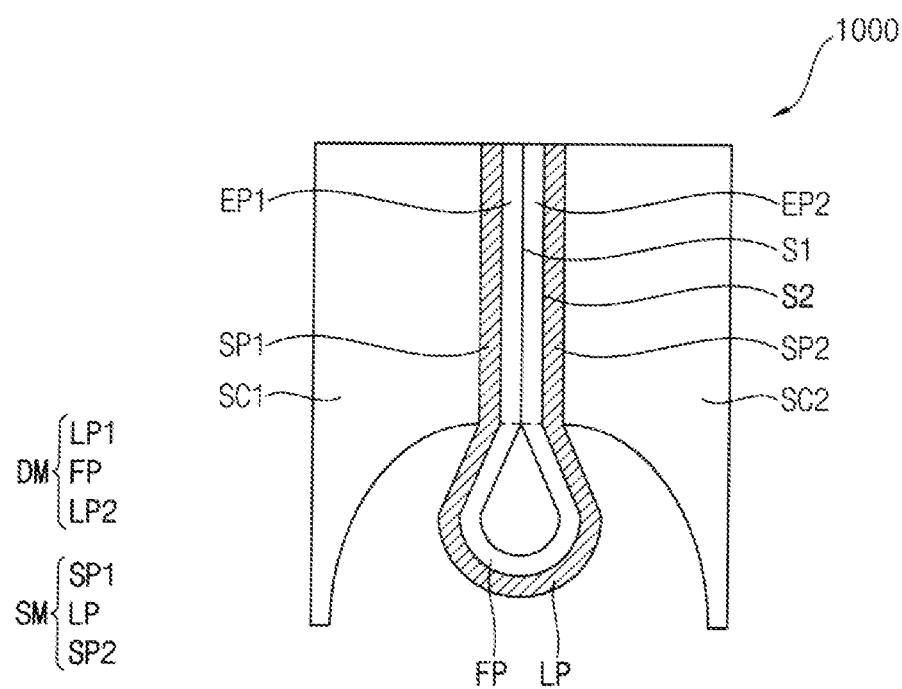
FIG. 3 is a schematic cross-sectional view illustrating a folded state of the display device of FIG. 1.
Figure 4:
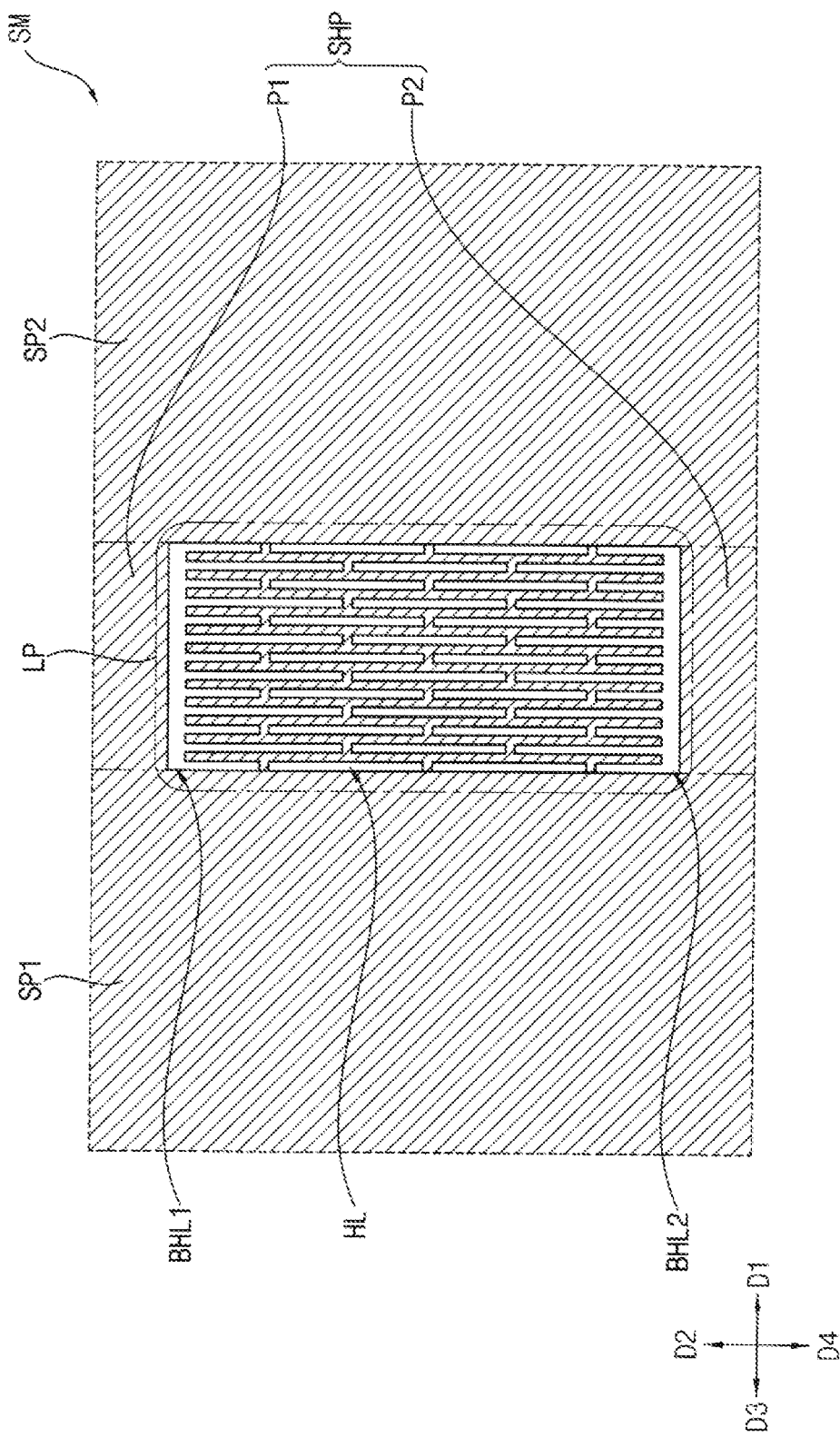
FIG. 4 is a schematic plan view illustrating a support part (e.g., member) included in the display device of FIG. 1.

FIG. 3 is a schematic cross-sectional view illustrating a folded state of the display device of FIG. 1. FIG. 4 is a schematic plan view illustrating a support part (e.g., member) included in the display device of FIG. 1.

Referring to FIGS. 1, 3, and 4, the display device 1000 may include the display module DM, the support member SM, and the set cover SC. The display module DM may include a first flat portion EP1, a second flat portion EP2, and a folding portion FP disposed between the first flat portion EP1 and the second flat portion EP2. The support member SM may include a first support portion SP1, a second support portion SP2, a lattice portion LP, and a shape holding portion SHP.

In case that the display device 1000 is folded, the display module DM may be folded so that portions of a display surface S1 face each other. For example, in case that an external force is applied by a user to the display device 1000 in an unfolded state, the first set cover SC1 may rotate in a clockwise direction, and the second set cover SC2 may rotate in a counterclockwise direction. Accordingly, the display surface S1 of the first flat portion EP1 and the display surface S1 of the second flat portion EP2 may face each other.

The support member SM may be disposed under the display module DM. In an embodiment, the support member SM may be formed of metal and may support the display module DM. For example, the support member SM may include at least one of invar which may be an alloy of nickel ("Ni") and iron ("Fe"), stainless steel ("SUS"), titanium ("Ti"), and copper ("Cu"). In another embodiment, the support member SM may be formed of a non-metal, plastic, glass fiber reinforced plastic and/or glass. For example, the plastic may include polyimide, polyethylene, polyethylene terephthalate, and the like, and is not particularly limited.

In an embodiment, the first support portion SP1 may overlap the first flat portion EP1. Accordingly, the first support portion SP1 may support the first flat portion EP1. The second support portion SP2 may overlap the second flat portion EP2. Accordingly, the second support portion SP2 may support the second flat portion EP2.

In an embodiment, the lattice portion LP may overlap the folding portion FP. Accordingly, the lattice portion LP may support the folding portion FP. Holes HL may be formed in the lattice portion LP. The holes HL may penetrate the support member SM in a thickness direction of the support member SM. As the holes HL may penetrate the support member SM, the support member SM may be smoothly folded. Accordingly, the display module DM may be smoothly folded.

In an embodiment, the shape holding portion SHP may include a first portion P1 and a second portion P2. The first portion P1 may be adjacent to the lattice portion LP in a second direction D2 crossing the first direction D1. The second portion P2 may be adjacent to the lattice portion LP in a fourth direction D4 opposite to the second direction D2. The shape holding portion SHP may be integrally formed with the first support portion SP1 and the second support portion SP2, and may be disposed between the first support portion SP1 and the second support portion SP2.

The shape holding portion SHP may be disposed to be adjacent to an outermost area of the support member SM, and may overlap the folding portion FP. In other words, the first portion P1 may be disposed to be adjacent to an upper end of the support member SM, and may overlap the folding portion FP. The second portion P2 may be disposed to be adjacent to a lower end of the support member SM, and may overlap the folding portion FP.

The shape holding portion SHP may maintain a shape of the support member SM. In detail, the shape holding portion SHP may prevent the lattice portion LP having relatively weak rigidity from being deformed. For example, due to the holes HL formed in the lattice portion LP, the lattice portion LP may be expanded in the first direction D1 and a third direction D3 opposite to the first direction D1. The holes HL may be deformed. However, as the shape holding portion SHP may be integrally formed with the first and second support portions SP1 and SP2, the shape holding portion SHP may prevent the lattice portion LP from being expanded or the holes HL from being deformed.

In an embodiment, a first boundary hole BHL1 and a second boundary hole BHL2 may be further formed in the lattice portion LP. The first boundary hole BHL1 may connect the holes HL adjacent to the first portion P1 to each other. The second boundary hole BHL2 may connect the holes HL adjacent to the second portion P2 to each other.

The first boundary hole BHL1 and the second boundary hole BHL2 may define a boundary between the holes HL and the shape holding portion SHP. In other words, the first boundary hole BHL1 and the second boundary hole BHL2 may separate the shape holding portion SHP from the holes HL. Accordingly, the shape holding portion SHP may effectively maintain the shape of the support member SM.

In an embodiment, a width of the first boundary hole BHL1 in the first direction D1 and a width of the second boundary hole BHL2 in the first direction D1 may be substantially equal to a width of the lattice portion LP in the first direction D1. A size of the first boundary hole BHL1 (e.g., a plane area of the first boundary hole BHL1) and a size of the second boundary hole BHL2 may be larger than a size of each of the holes HL.

Figure 5:
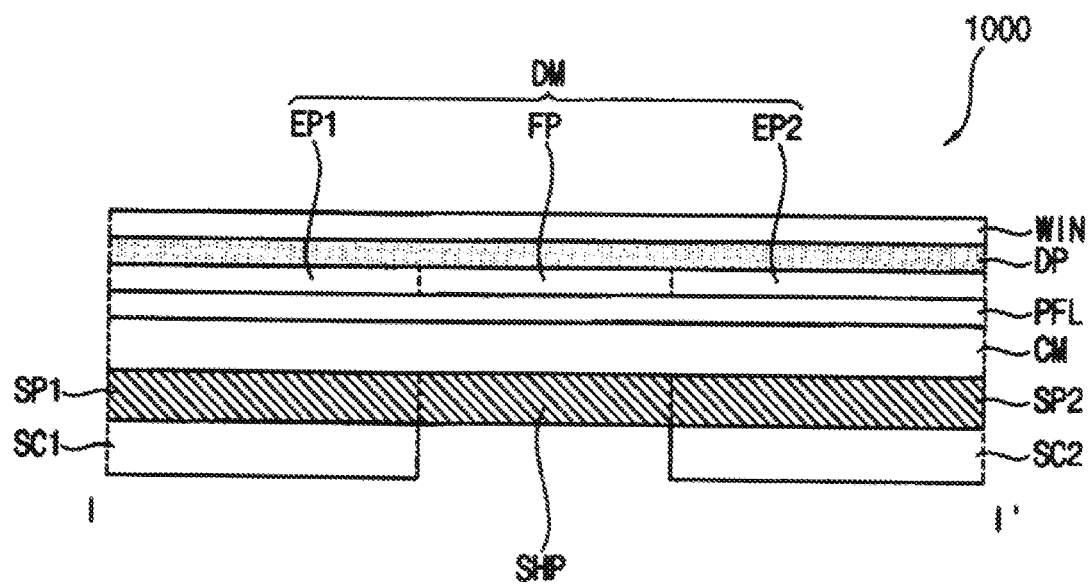
FIG. 5 is a schematic cross-sectional view taken along line I-I' of FIG. 1.
Figure 6:
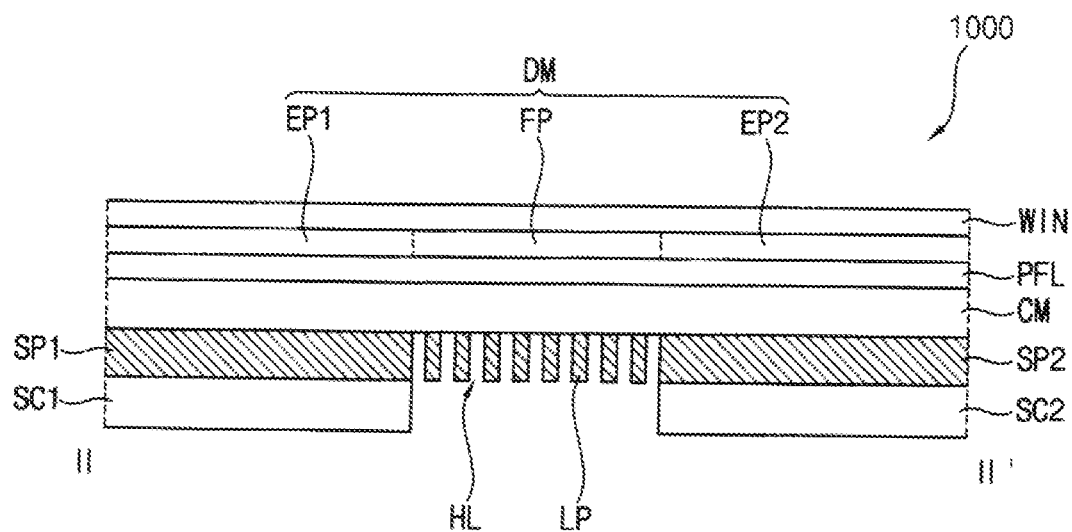
FIG. 6 is a schematic cross-sectional view taken along line II-II' of FIG. 1.
Figure 7:
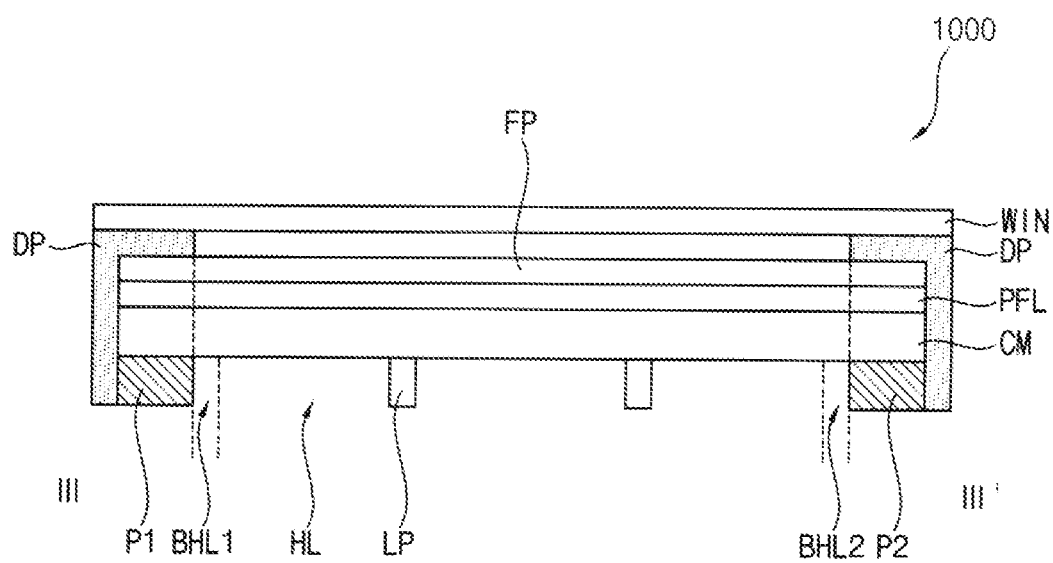
FIG. 7 is a schematic cross-sectional view taken along line III-III' of FIG. 1.

FIG. 5 is a schematic cross-sectional view taken along line I-I' of FIG. 1. FIG. 6 is a schematic cross-sectional view taken along line II-II' of FIG. 1. FIG. 7 is a schematic cross-sectional view taken along line III-III' of FIG. 1.

Referring to FIG. 5, the display device 1000 may include the set cover SC, the support member SM, a cushion member CM, a protective film PFL, the display module DM, the deco pattern DP, and the window WIN.

The first set cover SC1 may overlap the first support portion SP1 and the first flat portion EP1. The first set cover SC1 may support the first support portion SP1 and the first flat portion EP1. The second set cover SC2 may overlap the second support portion SP2 and the second flat portion EP2. The second set cover SC2 may support the second support portion SP2 and the second flat portion EP2.

The support member SM may be disposed on the set cover SC. The shape holding portion SHP may be disposed to be adjacent to the outermost area of the support member SM, and may overlap the folding portion FP.

In an embodiment, the cushion member CM may be disposed on the support member SM. The cushion member CM may buffer an external shock that may be applied to the display module DM, and may protect the display module DM. For example, the cushion member CM may include a material capable of buffering by containing air, such as a cushion and a sponge. In order to facilitate folding and unfolding of the display module DM, the cushion member CM may include a flexible material. For example, the cushion member CM may include an acrylic resin, polyurethane, thermoplastic polyurethane ("TPU"), latex, polyurethane foam, polystyrene foam, or a combination thereof. In another embodiment, the cushion member CM may be disposed under the support member SM.

The protective film PFL may be disposed on the cushion member CM. The protective film PFL may prevent penetration of moisture and oxygen from the outside and may absorb external impact. In order to implement a flexible display device, the display module DM may include a flexible plastic substrate, and the protective film PFL may support the plastic substrate.

For example, the protective film PFL may be a plastic film. For example, the protective film PFL may include polyethersulfone ("PS"), polyacrylate, polyetherimide ("PEI"), polyethylenenaphthalate ("PEN"), polyphenylene sulfide ("PPS"), polyarylate ("PAR"), polycarbonate ("PC"), poly(arylene ethersulfone), polyethylene terephthalate ("PET"), polyimide ("PI"), and the like, or a combination thereof.

The display module DM may be disposed on the protective film PFL. The display module DM will be described with reference to FIGS. 8 to 10.

The window WIN may be disposed on the display module DM. The window WIN may constitute a front surface of the display device 1000 and may protect the display module DM. The window WIN may include polymethyl methacrylate ("PMMA"), polyethylene terephtalate ("PET"), or the like.

Referring to FIG. 6, the support member SM may be disposed on the set cover SC. The lattice portion LP may overlap the folding portion FP, and the first and second support portions SP1 and SP2 may overlap the first and second flat portions EP1 and EP2, respectively. The holes HL may be formed in the lattice portion LP. By the holes HL, the folding portion FP may be smoothly folded.

Referring to FIG. 7, in an embodiment, the deco pattern DP may overlap the shape holding portion SHP. For example, the deco pattern DP may overlap the first portion P1 and the second portion P2. In other words, the deco pattern DP may overlap the outermost area. The deco pattern DP may cover a side surface of the shape holding portion SHP. As the deco pattern DP overlaps the shape holding portion SHP and covers the side surface of the shape holding portion SHP, the deco pattern DP may prevent the display module DM from being deformed and may prevent the deformed display module DM from being visually recognized by the user.

Figure 8:
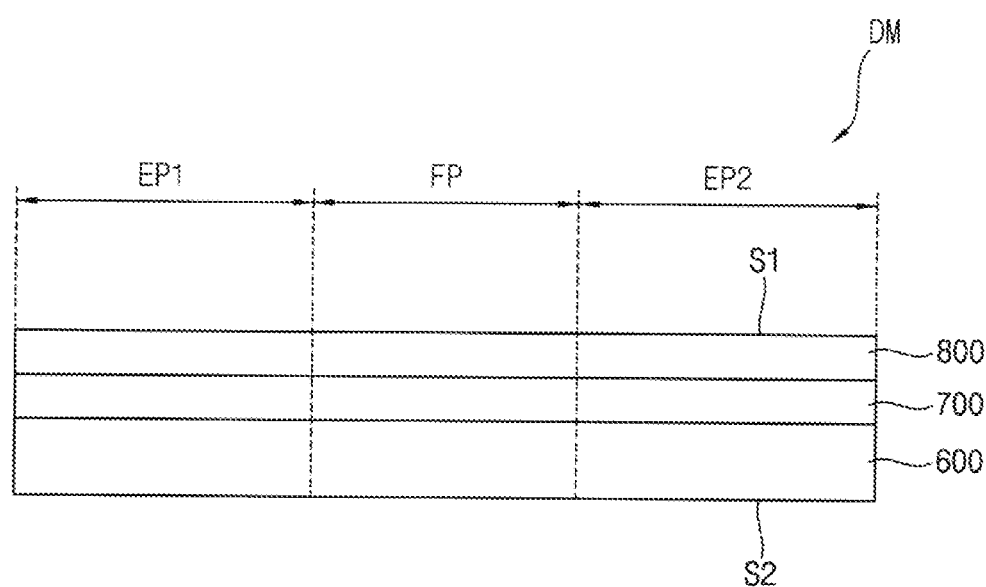
FIG. 8 is a schematic cross-sectional view illustrating a display part (e.g., module) included in the display device of FIG. 1.

FIG. 8 is a schematic cross-sectional view illustrating a display part (e.g., module) included in the display device of FIG. 1.

Referring to FIG. 8, the display module DM may include a display panel 600, a sensing layer 700, and a polarizing layer 800. Each of the display panel 600, the sensing layer 700, and the polarizing layer 800 may have flexible characteristics.

The display panel 600 may include pixels, and may generate an image in which light emitted from each of the pixels may be combined. The light may be emitted toward the display surface S1, and the non-display surface S2 of the display panel 600 may be a non-display surface S2 of the display module DM.

The sensing layer 700 may be disposed on the display panel 600. The sensing layer 700 may sense an external input, such as when an external object contacts or approaches the display device 1000. For example, the sensing layer 700 may sense the external input in a capacitive method.

The polarizing layer 800 may be disposed on the sensing layer 700. The polarizing layer 800 may reduce reflection of external light from the display device 1000. For example, in case that external light passes through the polarizing layer 800 and is reflected from the lower portion (e.g., the display panel 600) of the polarizing layer 800 and passes through the polarizing layer 800 again, as the external light passes through the polarizing layer 800 twice, the phase of the external light may be changed. As the phase of the reflected light may be different from the phase of the incident light passing through the polarizing layer 800, extinction interference may occur between the incident light and the reflected light. Accordingly, reflection of external light may be reduced, and visibility of the display device 1000 may be improved.

Figure 9:
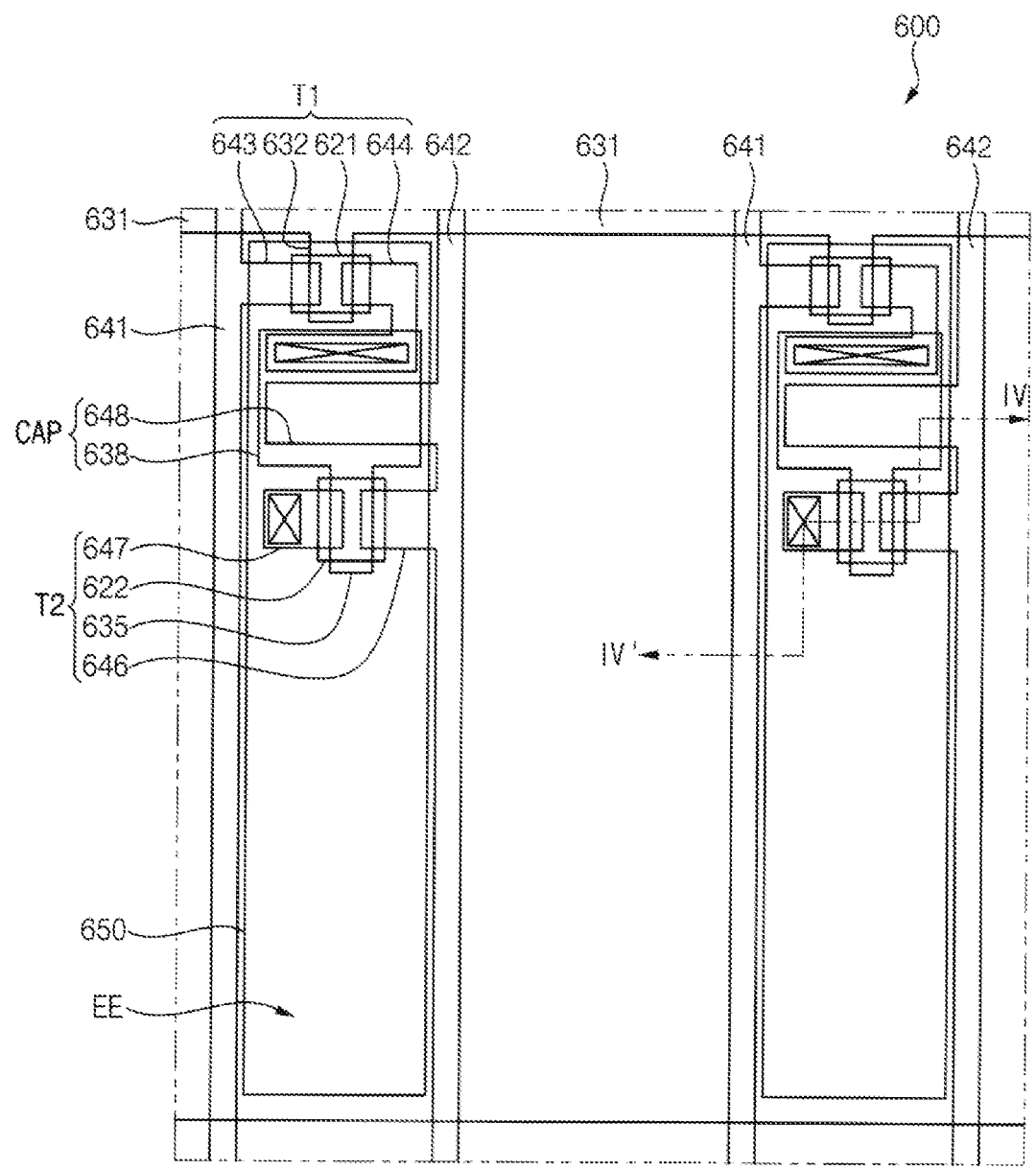
FIG. 9 is a schematic plan view illustrating a display panel included in the display device of FIG. 8.
Figure 10:
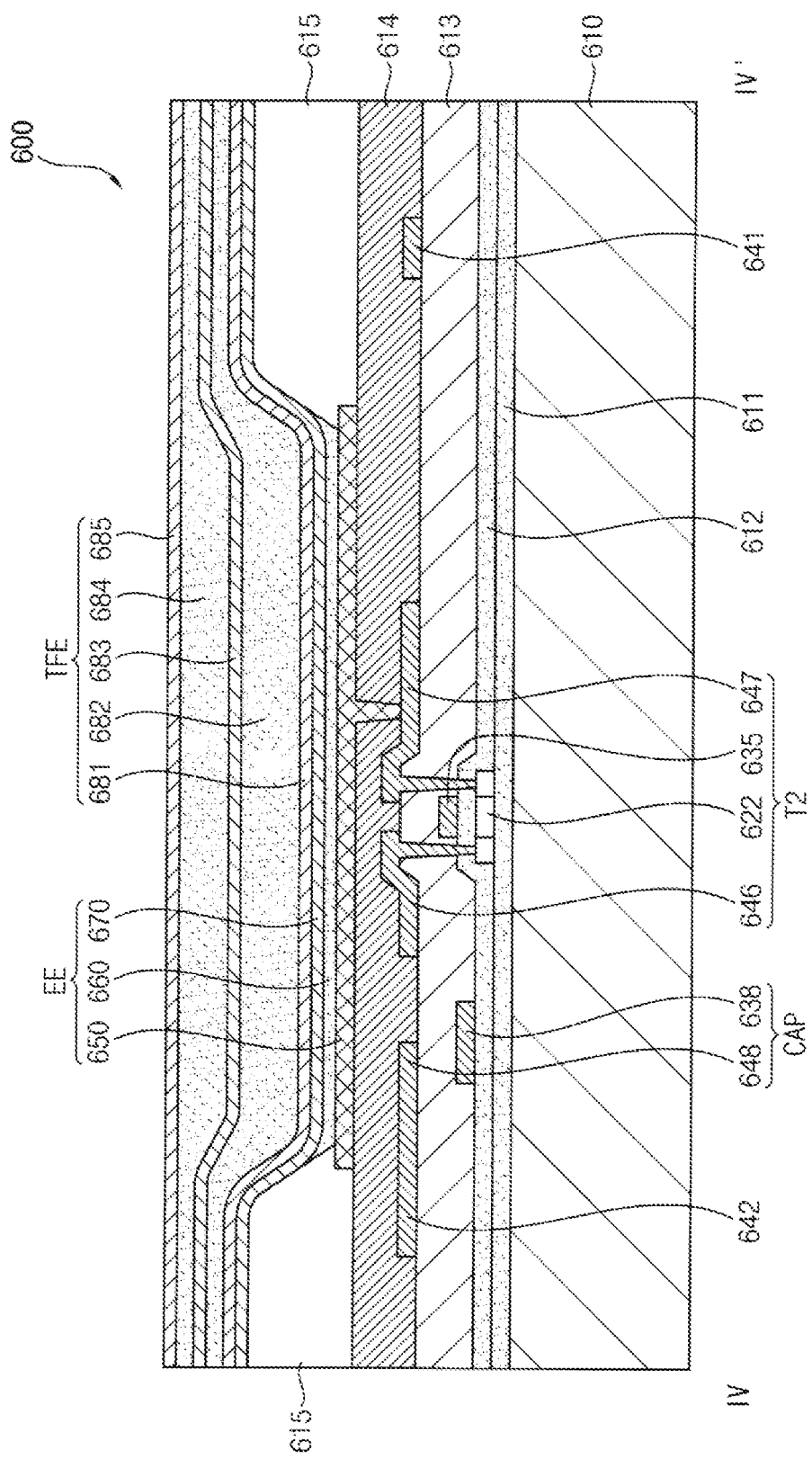
FIG. 10 is a schematic cross-sectional view illustrating the display panel of FIG. 9.

FIG. 9 is a schematic plan view illustrating a display panel included in the display device of FIG. 8. FIG. 10 is a cross-sectional view illustrating the display panel of FIG. 9.

Referring to FIGS. 9 and 10, the display panel 600 may include the pixels. Each of the pixels may include a switching thin film transistor T1, a driving thin film transistor T2, a storage capacitor CAP, and a light emitting diode EE. The display panel 600 may display an image through the pixels.

As shown in FIGS. 9 and 10, two thin film transistors and one storage capacitor may be disposed in one pixel, but embodiments are not limited thereto. For example, one pixel may include three or more thin film transistors and/or two or more storage capacitors.

The display panel 600 may include a substrate 610, a gate line 631 disposed on the substrate 610, a data line 641 disposed on the gate line 631, and a common power line 642. For example, one pixel may be defined by a boundary between the gate line 631, the data line 641, and the common power line 642. In other embodiments, the pixel may be defined by a black matrix or a pixel defining layer.

The substrate 610 may include a flexible material such as plastic. For example, the substrate 610 may be formed of polyethersulfone ("PES"), polycarbonate ("PC"), polyimide ("PI"), polyethylene terephthalate ("PET"), polyethylene naphthalate ("PEN"), polyacrylate, fiber reinforced plastic ("FRP"), or the like, or a combination thereof.

The substrate 610 may have a thickness of about 5 um to about 200 um. When the substrate 610 has a thickness less than about 5 um, it may be difficult for the substrate 610 to stably support the light emitting diode EE. In case that the substrate 610 has a thickness greater than about 200 um, the flexible characteristics of the substrate 610 may be deteriorated.

The buffer layer 611 may be disposed on the substrate 610. The buffer layer 611 may prevent penetration of impurities and may serve to planarize a surface. The buffer layer 611 may be formed of silicon nitride, silicon oxide, silicon oxynitride, or the like, or a combination thereof. However, the buffer layer 611 may be omitted.

A switching semiconductor layer 621 and a driving semiconductor layer 622 may be disposed on the buffer layer 611. The switching semiconductor layer 621 and the driving semiconductor layer 622 may be formed of at least one of polycrystalline silicon, amorphous silicon, and an oxide semiconductor (e.g., indium gallium zinc oxide ("IGZO"), indium zinc tin oxide ("IZTO"), etc.). For example, in case that the driving semiconductor layer 622 is formed of polycrystalline silicon, the driving semiconductor layer 622 may include a channel region that may not be doped with impurities, and a source region and a drain region doped with the impurities. The impurities may vary depending on the type of thin film transistor.

A gate insulating layer 612 may be disposed on the switching semiconductor layer 621 and the driving semiconductor layer 622. The gate insulating layer 612 may be formed of tetraethoxysilane ("TEOS"), silicon nitride, silicon oxide, or the like, or a combination thereof. In an embodiment, the gate insulating layer 612 may have a double layer structure in which a silicon nitride layer having a thickness of about 40 nm and a tetraethoxysilane layer having a thickness of about 80 nm may be sequentially stacked on each other.

A gate line including gate electrodes 632 and 635 may be disposed on the gate insulating layer 612. The gate line may include the gate line 631 and a first capacitor plate 638. The gate electrodes 632 and 635 may be disposed to overlap a portion (e.g., a channel region) of the semiconductor layers 621 and 622.

The gate electrodes 632 and 635 and the first capacitor plate 638 may be disposed in the same layer and may be formed of substantially the same metal. For example, the gate electrodes 632 and 635 and the first capacitor plate 638 may be formed of molybdenum ("Mo"), chromium ("Cr"), tungsten ("W"), or the like, or a combination thereof.

An interlayer insulating layer 613 covering the gate electrodes 632 and 635 may be disposed on the gate insulating layer 612. The interlayer insulating layer 613 may be formed of tetraethoxysilane, silicon nitride, silicon oxide, or the like.

Data lines including source electrodes 643 and 646 and drain electrodes 644 and 647 may be disposed on the interlayer insulating layer 613. The data line may further include a data line 641, the common power line 642, a second power storage plate 648, and the like. The source electrodes 643 and 646 and the drain electrodes 644 and 647 may be connected to a source region and a drain region of the semiconductor layers 621 and 622 through contact holes formed in the gate insulating layer 612 and the interlayer insulating layer 613.

The switching thin film transistor T1 may include the switching semiconductor layer 621, the switching gate electrode 632, the switching source electrode 643, and the switching drain electrode 644, and the driving thin film transistor T2 may include the driving semiconductor layer 622, the driving gate electrode 635, the driving source electrode 646, and the driving drain electrode 647. The storage capacitor CAP may include the first storage plate 638 and the second storage plate 648.

The switching thin film transistor T1 may be a switching element for selecting a pixel to emit light. The switching gate electrode 632 may be connected to the gate line 631. The switching source electrode 643 may be connected to the data line 641. The switching drain electrode 644 may be spaced apart from the switching source electrode 643 and may be connected to the first capacitor plate 638.

The driving thin film transistor T2 may apply a driving power to the pixel electrode 650 to emit light of the light emitting diode EE of the selected pixel. The driving gate electrode 635 may be connected to the first capacitor plate 638. Each of the driving source electrode 646 and the second capacitor plate 648 may be connected to the common power line 642. The driving drain electrode 647 may be connected to the pixel electrode 650 of the light emitting diode EE through a contact hole.

A planarization layer 614 covering the data line 641, the common power line 642, the source electrodes 643 and 646, the drain electrodes 644 and 647, and the second capacitor plate 648 may be disposed on the interlayer insulating layer 613.

The planarization layer 614 may be planarized by removing a step. The planarization film 614 may include an acrylic resin, an epoxy resin, a phenolic resin, a polyamides resin, a polyimide resin, an unsaturated polyester resin, polyphenylenes resin, polyphenylene sulfides resin, benzocyclobutene ("BCB"), and the like, or a combination thereof.

The pixel electrode 650 of the light emitting diode EE may be disposed on the planarization layer 614. The pixel electrode 650 may be connected to the drain electrode 647 through a contact hole formed in the planarization layer 614.

A pixel defining layer 615 may be disposed on the planarization layer 614 to define a pixel by exposing at least a portion of the pixel electrode 650. The pixel electrode 650 may be disposed to correspond to the pixel of the pixel defining layer 615. The pixel defining layer 615 may be formed of polyacrylates resin, polyimides resin, or the like, or a combination thereof.

An emission layer 660 may be disposed on the pixel electrode 650 in the pixel, and a common electrode 670 may be disposed on the pixel defining layer 615 and the emission layer 660. The emission layer 660 may be formed of a low molecular weight organic material or a high molecular weight organic material. At least one of a hole injection layer ("HIL") and a hole transport layer ("HTL") may be further disposed between the pixel electrode 650 and the emission layer 660, and at least one of an electron transport layer ("ETL") and an electron injection layer ("EIL") may be further disposed between the emission layer 660 and the common electrodes 670.

Each of the pixel electrode 650 and the common electrode 670 may be at least one of a transmissive electrode, a transflective electrode, and a reflective electrode.

The transmissive electrode may include a transparent conductive oxide ("TCO"). The transparent conductive oxide ("TCO") may include indium tin oxide ("ITO"), indium zinc oxide ("IZO"), zinc oxide ("ZnO"), indium oxide ("In2O3"), or the like, or a combination thereof.

The transflective electrode and the reflective electrode may include metal such as magnesium ("Mg"), silver ("Ag"), gold ("Au"), calcium ("Ca"), lithium ("Li"), chromium ("Cr"), aluminum ("Al"), copper ("Cu"), or alloys thereof.

A thin film encapsulation layer TFE may be disposed on the common electrode 670. The thin film encapsulation layer TFE may include one or more inorganic layers 681, 683, and 685 and one or more organic layers 682 and 684. The thin film encapsulation layer TFE may have a structure in which the inorganic layers 681, 683, and 685 and the organic layers 682 and 684 may be alternately stacked on each other. The inorganic layer 681 may be disposed on a lowermost portion.

The thin film encapsulation layer TFE may include three inorganic layers 681, 683, and 685 and two organic layers 682 and 684 in FIG. 10, but embodiments are not limited thereto.

The inorganic layers 681, 683, and 685 may be formed of one or more inorganic materials of Al2O3, TiO2, ZrO, SiO2, AlON, AlN, SiON, Si3N4, ZnO, and Ta2O5. The inorganic layers 681, 683, and 685 may be formed through chemical vapor deposition ("CVD") or atomic layer deposition ("ALD"). The inorganic layers 681, 683, and 685 may block penetration of moisture or oxygen.

The organic layers 682 and 684 may be formed of a polymer-based material. The polymer-based material may include acrylic resin, epoxy resin, polyimide, polyethylene, and the like, or a combination thereof. The organic layers 682 and 684 may be formed through a thermal evaporation process.

The thin film encapsulation layer TFE may be formed to a thickness of about 10 um or less. Accordingly, the overall thickness of the display panel 600 may be very thin. As the thin film encapsulation layer TFE may be disposed on the light emitting diode EE, the flexible characteristics of the display panel 600 may be improved.

Figure 11:
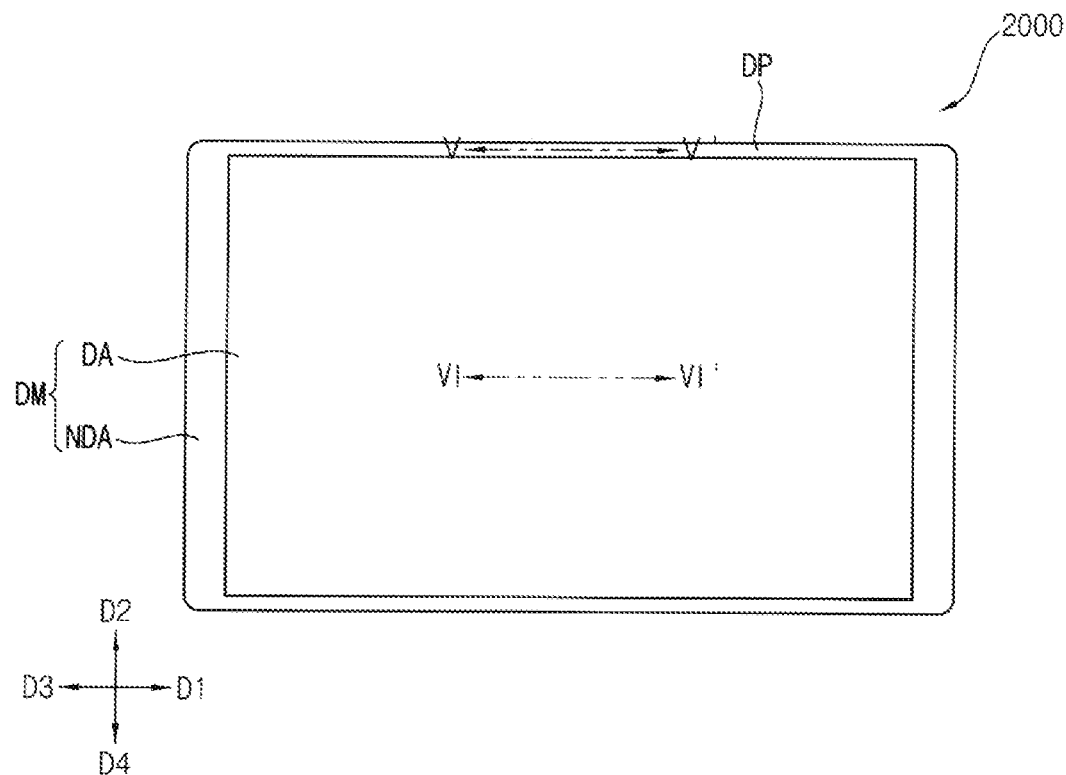
FIG. 11 is a schematic plan view illustrating an unfolded state of a display device according to another embodiment.
Figure 12:
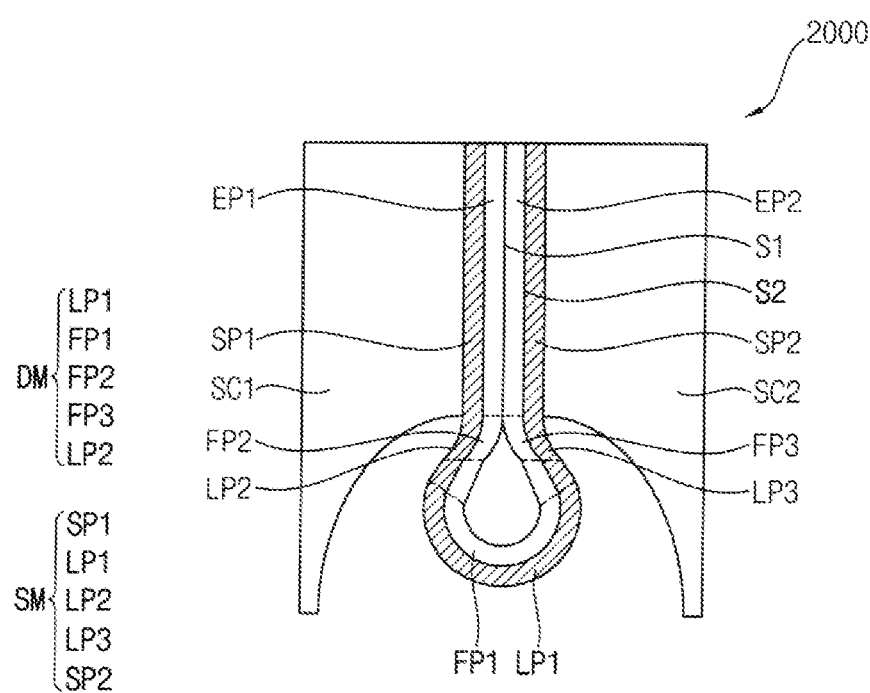
FIG. 12 is a schematic cross-sectional view illustrating a folded state of the display device of FIG. 11.

FIG. 11 is a schematic plan view illustrating an unfolded state of a display device according to another embodiment. FIG. 12 is a schematic cross-sectional view illustrating a folded state of the display device of FIG. 11.

Referring to FIGS. 11 and 12, a display device 2000 according to another embodiment may include a display module DM, a support member SM, the deco pattern DP, and the set cover SC. However, the deco pattern DP and the set cover SC may be substantially the same as the deco pattern DP and the set cover SC described with reference to FIGS. 1 and 2.

The display module DM may include a first flat portion EP1, a second flat portion EP2, and first to third folding portions FP1, FP2, and FP3 disposed between the first flat portion EP1 and the second flat portion EP2.

In case that the display device 2000 is folded, the display module DM may be folded so that portions of the display surface S1 face each other. For example, in case that an external force is applied by a user to the display device 2000 in an unfolded state, the first set cover SC1 may rotate in a clockwise direction, and the second set cover SC2 may rotate in a counterclockwise direction. Accordingly, the display surface S1 of the first flat portion EP1 and the display surface S1 of the second flat portion EP2 may face each other.

In an embodiment, the display module DM may include folding portions. For example, the display module DM may include the first folding portion FP1, the second folding portion FP2, and the third folding portion FP3. The second folding portion FP2 may be disposed between the first flat portion EP1 and the first folding portion FP1, and the first folding portion FP1 may be disposed between the second folding portion FP2 and the third folding portion FP3, and the third folding portion FP3 may be disposed between the first folding portion FP1 and the second flat portion EP2. As the display module DM may include the first to third folding portions FP1, FP2, and FP3, the display module DM may be folded in a dumbbell shape. Accordingly, a curvature of the second folding portion FP2 and a curvature of the third folding portion FP3 may be smaller than a curvature of the first folding portion FP1.

Figure 13:
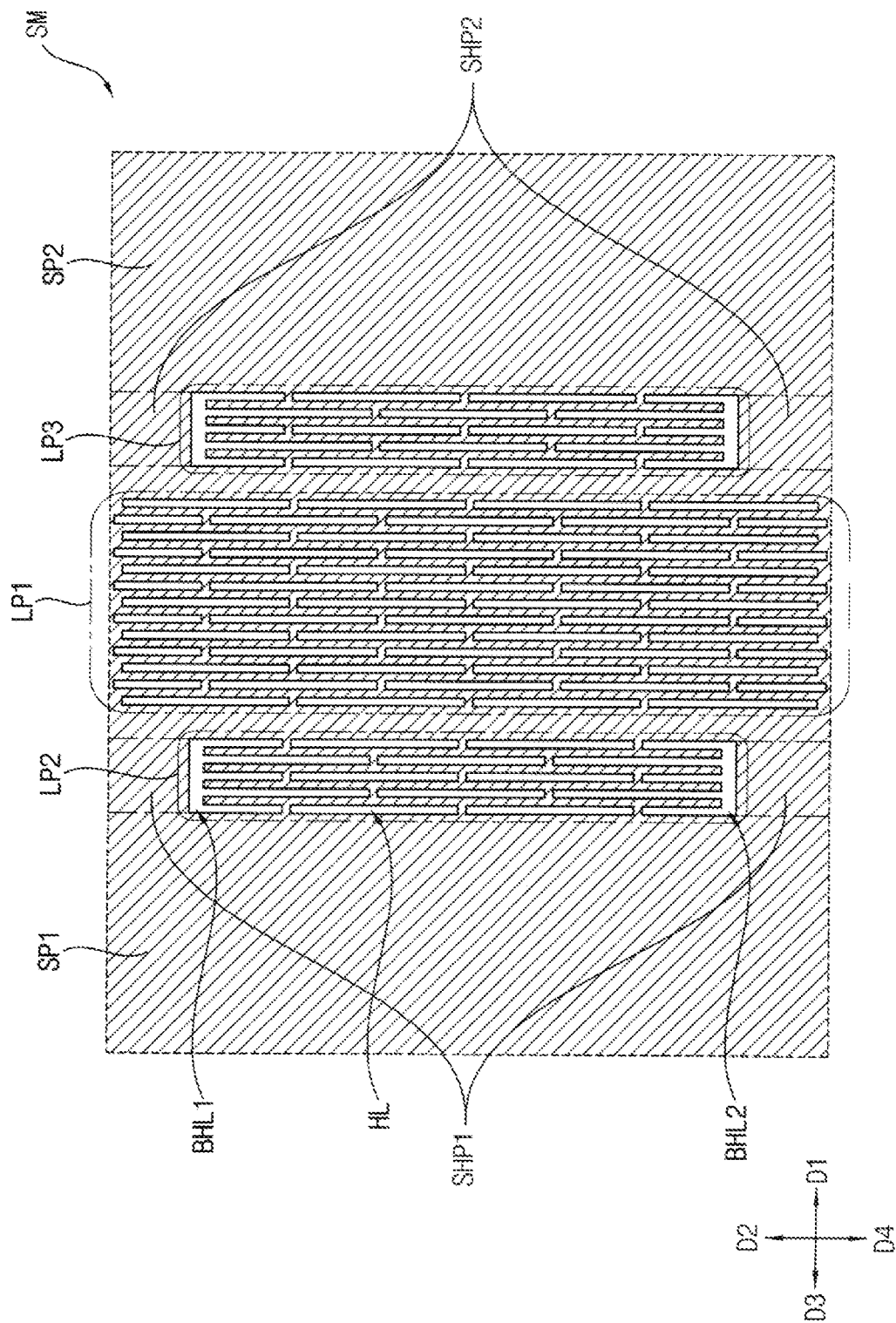
FIG. 13 is a schematic plan view illustrating an example of a support part (e.g., member) included in the display device of FIG. 11.

FIG. 13 is a schematic plan view illustrating an example of a support part (e.g., member) included in the display device of FIG. 11.

Referring to FIGS. 11, 12, and 13, the support member SM may be disposed under the display module DM. The support member SM may be formed of metal and may support the display module SM. For example, the support member SM may include at least one of invar which is an alloy of nickel ("Ni") and iron ("Fe"), stainless steel ("SUS"), titanium ("Ti"), and copper ("Cu").

The support member SM may include a first support portion SP1, a second support portion SP2, first to third lattice portions LP1, LP2, and LP3, a first shape holding portion SHP1, and a second shape holding portion SHP2. In an embodiment, the support member SM may have a structure symmetrical with respect to the first lattice portion LP1. In other words, the second lattice portion LP2 may have substantially the same structure as the third lattice portion LP3, and the first shape holding portion SHP1 may have substantially the same shape as the second shape holding portion SHP2.

In an embodiment, the first support portion SP1 may overlap the first flat portion EP1. Accordingly, the first support portion SP1 may support the first flat portion EP1. The second support portion SP2 may overlap the second flat portion EP2. Accordingly, the second support portion SP2 may support the second flat portion EP2.

In an embodiment, the first to third lattice portions LP1, LP2, and LP3 may overlap the first to third folding portions FP1, FP2, and FP3, respectively. Accordingly, the first to third lattice portions LP1, LP2, and LP3 may support the first to third folding portions FP1, FP2, and FP3, respectively. Holes HL may be formed in each of the first to third lattice portions LP1, LP2, and LP3. The holes HL may penetrate the support member SM in the thickness direction of the support member SM. As the holes HL may penetrate the support member SM, the support member SM may be smoothly folded. Accordingly, the display module DM may be smoothly folded.

In an embodiment, the first shape holding portion SHP1 may be adjacent to the second lattice portion LP2 in the second direction D2 and the fourth direction D4. The second shape holding portion SHP2 may be adjacent to the third lattice portion LP3 in the second direction D2 and the fourth direction D4.

The first and second shape holding portions SHP1 and SHP2 may be disposed to be adjacent to the outermost area of the support member SM, and may overlap the second folding portion FP2 and the third folding portion FP3, respectively. In other words, the first and second shape holding portions SHP1 and SHP2 may overlap the second and third folding portions FP2 and FP3 having relatively small curvatures, respectively. Since the curvature of each of the second and third folding portions FP2 and FP3 may be relatively small, the first and second shape holding portions SHP1 and SHP2 may not be deformed.

In an embodiment, a first boundary hole BHL1 and a second boundary hole BHL2 may be further formed in the second lattice portion LP2. The first and second boundary holes BHL1 and BHL2 may connect the holes HL adjacent to the first shape holding portions SHP1 to each other.

The first boundary hole BHL1 and the second boundary hole BHL2 may define a boundary between the holes HL and the first shape holding portion SHP1. In other words, the first boundary hole BHL1 and the second boundary hole BHL2 may separate the first shape holding portion SHP1 from the holes HL. Accordingly, the first shape holding portion SHP1 may effectively maintain the shape of the support member SM.

Figure 14:
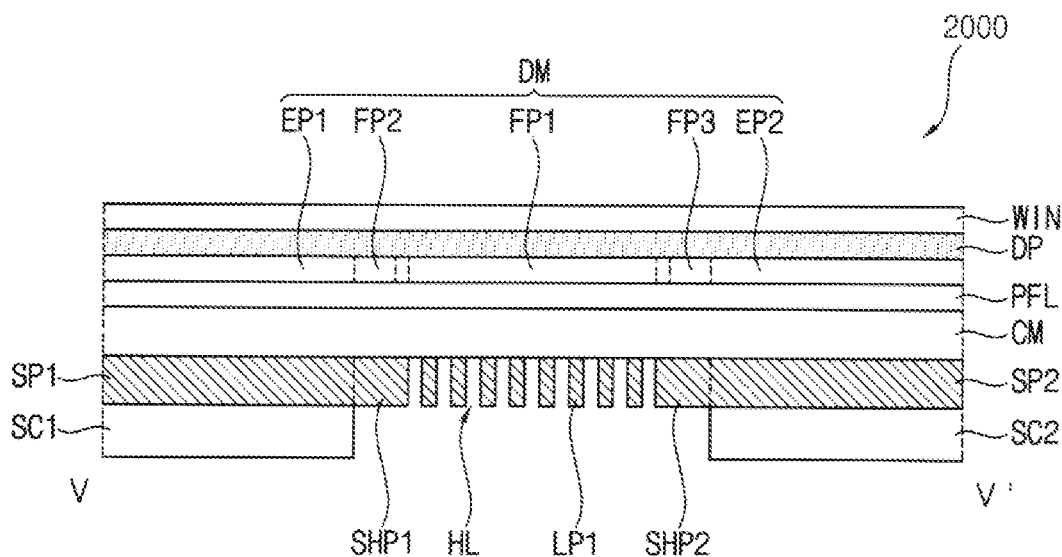
FIG. 14 is a schematic cross-sectional view taken along line V-V' of FIG. 11.
Figure 15:
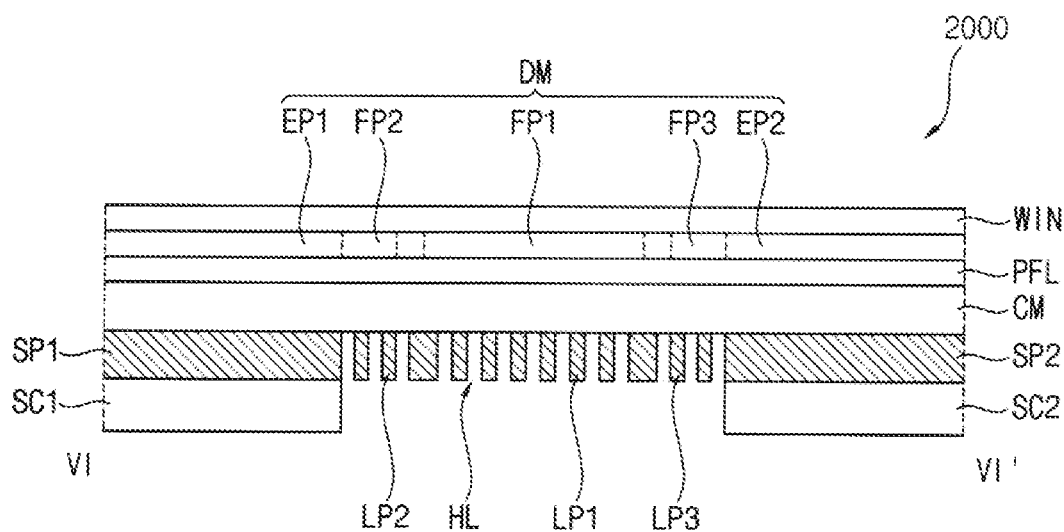
FIG. 15 is a schematic cross-sectional view taken along line VI-VI' of FIG. 11.

FIG. 14 is a schematic cross-sectional view taken along line V-V' of FIG. 11. FIG. 15 is a schematic cross-sectional view taken along line VI-VI' of FIG. 11.

Referring to FIG. 14, the display device 2000 may include the set cover SC, the support member SM, the cushion member CM, the protective film PFL, the display module DM, the deco pattern DP, and the window WIN.

The support member SM may be disposed on the set cover SC. The first and second shape holding portions SHP1 and SHP2 may be disposed to be adjacent to the outermost area of the support member SM. The first lattice portion LP1 may overlap the first folding portion FP1, the first shape holding portion SHP1 may overlap the second folding portion FP2, and the second shape holding portion SHP2 may overlap the third folding portion FP3.

Referring to FIG. 15, the support member SM may be disposed on the set cover SC. The first lattice portion LP1 may overlap the first folding portion FP1, the second lattice portion LP2 may overlap the second folding portion FP2, and the third lattice portion LP3 may overlap the third folding portion FP3.

FIG. 16 is a schematic plan view illustrating another example of a support part (e.g., member) included in the display device of FIG. 11.

Referring to FIG. 16, the support member SM may include a first support portion SP1, a second support portion SP2, first to third lattice portions LP1, LP2, and LP3, and a first shape holding portion SHP1, and a second shape holding portion SHP2. However, the first support portion SP1, the second support portion SP2, the first lattice portion LP1, the first shape holding portion SHP1, and the second shape holding portion SHP2 may be substantially the same as the first support portion SP1, the second support portion SP2, the first lattice portion LP1, the first shape holding portion SHP1, and the second shape holding portion SHP2 described with reference to FIG. 13.

The second and third lattice portions LP2 and LP3 may overlap the second and third folding portions FP2 and FP3, respectively. Accordingly, the second and third lattice portions LP2 and LP3 may support the second and third folding portions FP2 and FP3, respectively.

A first hole HL1 and a second hole HL2 may be formed in the second and third lattice portions LP2 and LP3, respectively. The first hole HL1 and the second hole HL2 may penetrate the support member SM in the thickness direction of the support member SM. As the first and second holes HL1 and HL2 may penetrate the support member SM, the support member SM may be smoothly folded. Accordingly, the display module DM may be smoothly folded.

In an embodiment, a first boundary hole BHL1 and a second boundary hole BHL2 may be further formed in the second lattice portion LP2. The first boundary hole BHL1 and the second boundary hole BHL2 may be connected to (e.g., extended to) the first hole HL1. The first boundary hole BHL1 and the second boundary hole BHL2 may define a boundary between the first hole HL1 and the first shape holding portion SHP1. In other words, the first boundary hole BHL1 and the second boundary hole BHL2 may separate the first shape holding portion SHP1 from the first hole HL. Accordingly, the first shape holding portion SHP1 may effectively maintain the shape of the support member SM. The first boundary hole BHL1 and the second boundary hole BHL2 may not be connected to the second hole HL2.

Display devices 1000 and 2000 according to illustrative embodiments may include a display module DM including at least one folding portion FP and a support member SM disposed under the display module DM. The support member SM may include a lattice portion LP overlapping the folding portion FP and a shape holding portion SHP adjacent to the lattice portion LP. The shape holding portion SHP may maintain the shape of the support member SM. For example, the shape holding portion SHP may prevent the lattice portion LP having relatively weak rigidity from being deformed. Accordingly, wrinkles due to folding may not occur on the upper surfaces of the display devices 1000 and 2000, and the display devices 1000 and 2000 may easily perform folding and unfolding.

Although the display devices according to embodiments have been described with reference to the drawings, the illustrated embodiments are merely examples, and may be modified and changed by a person having ordinary skill in the art without departing from the technical spirit described in the following claims including any equivalents thereof.

What is claimed is:

1. A display device comprising:
   a display part including:
      a first flat portion;
      a second flat portion spaced apart from the first flat portion in a first direction;
      a first folding portion disposed between the first flat portion and the second flat portion; and
      a second folding portion disposed between the first flat portion and the first folding portion; and
   a support part disposed under the display part and including a first lattice portion, a second lattice portion and a first shape holding portion, wherein
   holes are disposed in each of the first lattice portion and the second lattice portion,
   a first boundary hole is disposed in the second lattice portion an connected to at least one of the holes adjacent to the first shape holding portion,
   the first shape holding portion includes no holes,
   the first shape holding portion is adjacent to the second lattice portion in a second direction intersecting the first direction and is in contact with an edge of the second lattice portion,
   the first lattice portion overlaps the first folding portion, and
   the second lattice portion and the first shape holding portion overlap the second folding portion.

2. The display device of claim 1, wherein the first lattice portion is in contact with the first shape holding portion.

3. The display device of claim 1, wherein the support part further includes a second shape holding portion adjacent to the second lattice portion in a third direction opposing the second direction, in contact with the edge of the second lattice portion and overlapping the second folding portion.

4. The display device of claim 1, wherein a curvature of the second folding portion is smaller than a curvature of the first folding portion.

5. The display device of claim 3, further comprising:
   a deco pattern disposed on the display part and overlapping an outermost area of the support part.

6. The display device of claim 5, wherein the deco pattern covers a side surface of each of the first shape holding portion and the second shape holding portion.

7. The display device of claim 3 wherein
the support part further includes:
a first support portion overlapping the first flat portion; and
a second support portion overlapping the second flat portion, and
the first shape holding portion, the second shape holding portion, the first support portion and the second support portion are integral with each other.

8. The display device of claim 3, further comprising:
a second boundary hole disposed in the second lattice portion and connected to at least one of the holes adjacent to the second shape holding portion.

9. The display device of claim 1, wherein a width of the first boundary hole in the first direction is equal to a width of the second lattice portion in the first direction.

10. The display device of claim 1, wherein a size of the first boundary hole is larger than a size of each of the holes.

11. The display device of claim 1, wherein the holes completely penetrate the support part in a thickness direction of the support part.

12. A display device comprising:
a display part including:
a first flat portion;
a second flat portion spaced apart from the first flat portion in a first direction;
a first folding portion disposed between the first flat portion and the second flat portion;
a second folding portion disposed between the first flat portion and the first folding portion; and
a third folding portion disposed between the first folding portion and the second flat portion; and
a support part disposed under the display part and including a first lattice portion, a second lattice portion, a third lattice portion, a first shape holding portion and a second shape holding portion, wherein
holes are disposed in each of the first lattice portion, the second lattice portion and the third lattice portion,
a first boundary hole is disposed in the second lattice portion, the first boundary hole connecting the holes adjacent to the first shape holding portion,
each of the first shape holding portion and the second shape holding portion includes no holes,
the first shape holding portion is adjacent to the second lattice portion in a second direction intersecting the first direction,
the second shape holding portion is adjacent to the third lattice portion in the second direction,
the first lattice portion overlaps the first folding portion,
the second lattice portion and the first shape holding portion overlap the second folding portion,
the third lattice portion and the second shape holding portion overlap the third folding portion, and
a length of the first lattice portion in the first direction is greater than a length of the second lattice portion in the first direction.

13. The display device of claim 12, wherein a curvature of the second folding portion and a curvature of the third folding portion are smaller than a curvature of the first folding portion.

14. The display device of claim 12, wherein the support part has a structure symmetrical with respect to the first lattice portion.

15. The display device of claim 12, wherein
a second boundary hole is disposed in the third lattice portion, and
the second boundary hole connects the holes adjacent to the second shape holding portion.

16. A display device comprising:
a display part including:
a first flat portion,
a second flat portion spaced apart from the first flat portion in a first direction;
a first folding portion disposed between the first flat portion and the second flat portion;
a second folding portion disposed between the first flat portion and the first folding portion; and
a third folding portion dispose between the fir portion and the second flat portion; and
a support part disposed under the display part and including a first lattice portion, a second lattice portion, a third lattice poition, a first shape holding portion and a second shape holding portion, wherein
holes are disposed in each of the first lattice portion, the second lattice portion and the third lattice portion,
each of the first shape holding portion and the second shape holding portion includes no holes,
the first shape holding portion is adjacent to the second lattice portion in a second direction intersecting the first direction,
the second shape holding portion is adjacent to the third lattice portion in a second direction,
the first lattice portion overlaps the first folding portion,
the second lattice portion and the first shape holding portion overlap the second folding portion,
the third lattice portion and the second shape holding portion overlap the third folding portion,
a length of the first lattice portion in the first direction is greater than a length of the second lattice portion in the first direction, and
a first hole and a boundary hole connected to the first hole are disposed in each of the second lattice portion and the third lattice portion.

17. The display device of claim 16, wherein a second hole not connected to the boundary hole is further disposed in each of the second lattice portion and the third lattice portion.

18. The display device of claim 12, wherein the first lattice portion is in contact with an edge of the first holding portion.

19. The display device of claim 12, further comprising:
a deco pattern disposed on the display part and overlapping an outermost area of the support part.

20. The display device of claim 1, wherein the first boundary hole is connected to multiple holes adjacent to the first shape holding portion.

* * * * *